United States Patent [19]
Nelson et al.

[11] Patent Number: 5,295,800
[45] Date of Patent: Mar. 22, 1994

[54] APPARATUS FOR GAS ASSISTED INJECTION MOLDING HAVING PRECISE CONTROL OF INJECTION AND HOLDING PRESSURE WITH STEPPED HOLDING PRESSURE CAPABILITY

[75] Inventors: William A. Nelson, New Baltimore; Joseph Shemanski, Shelby Township, Oceana County, both of Mich.

[73] Assignee: Automotive Plastic Technology, Inc., Sterling Heights, Mich.

[21] Appl. No.: 800,176

[22] Filed: Nov. 27, 1991

Related U.S. Application Data

[63] Continuation-in-part of Ser. No. 628,746, Dec. 17, 1990, Pat. No. 5,200,127.

[51] Int. Cl.$^5$ .............................................. B29C 45/77
[52] U.S. Cl. ................................. 425/130; 264/572; 425/146; 425/149; 425/872
[58] Field of Search ............... 425/130, 145, 146, 149, 425/812; 264/572

[56] References Cited

U.S. PATENT DOCUMENTS

| 4,106,617 | 8/1978 | Boone | 248/201 |
|---|---|---|---|
| 4,106,887 | 8/1978 | Yasuike et al. | 425/549 |
| 4,136,220 | 1/1979 | Olabisi | 428/159 |
| 4,140,672 | 2/1979 | Kataoka | 425/817 R |
| 4,247,515 | 1/1981 | Olabisi | 264/500 |
| 4,498,860 | 2/1985 | Gahan | 425/562 |
| 4,824,732 | 4/1989 | Hendry et al. | 425/817 R |
| 4,830,812 | 5/1989 | Kauer | 425/812 |
| 4,855,094 | 8/1989 | Hendry | 425/562 |
| 4,913,644 | 4/1990 | Kauer | 425/812 |
| 4,923,666 | 5/1990 | Yamazaki | 425/812 |
| 4,923,677 | 5/1990 | Simon et al. | 422/37 |
| 4,935,191 | 6/1990 | Baxi | 425/812 |
| 4,943,407 | 7/1990 | Hendry | 425/812 |
| 4,944,910 | 7/1990 | Hendry | 425/812 |
| 4,948,547 | 8/1990 | Hendry | 425/812 |
| 5,015,166 | 5/1991 | Baxi | 425/812 |
| 5,028,377 | 7/1991 | Hendry | 425/812 |
| 5,039,463 | 8/1991 | Loren | 264/572 |

OTHER PUBLICATIONS

Webster's Ninth New Collegiate Dictionary, 1986, p. 767.

Primary Examiner—Tim Heitbrink
Attorney, Agent, or Firm—Howard & Howard

[57] ABSTRACT

A method and apparatus for gas assisted injection molding which will first inject a shot of molten plastic into a suitable mold, shut off the plastic flow into the mold, and either immediately, or after a delayed time, inject a suitable pressurized gas into the mold at a desired injection pressure. The pressure of the gas in the mold is then controlled by stepping up or stepping down the pressure in the mold in a series of steps to arrive at a second predetermined and precisely controlled pressure. The predetermined pressure is held for a desired time. The setting and holding of pressure is repeated as many times as desired, and is then stepped down to a final pressure. The mold is then opened, and the article is removed.

23 Claims, 6 Drawing Sheets

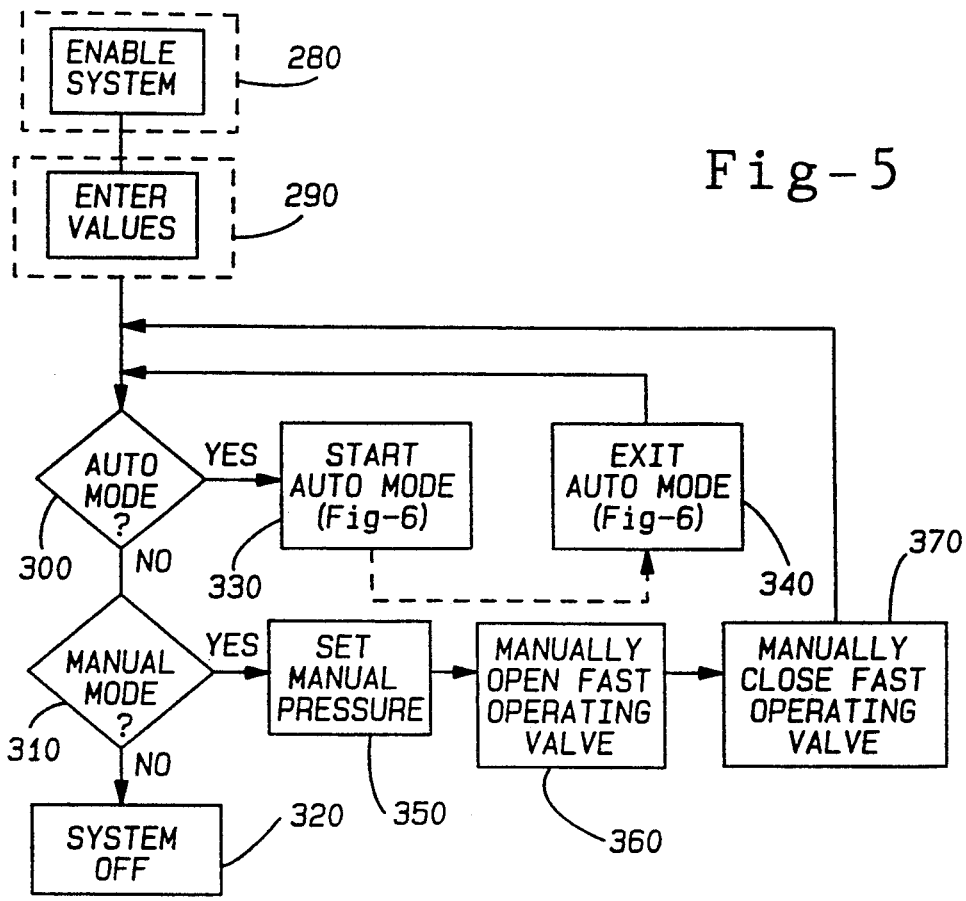
Fig-5
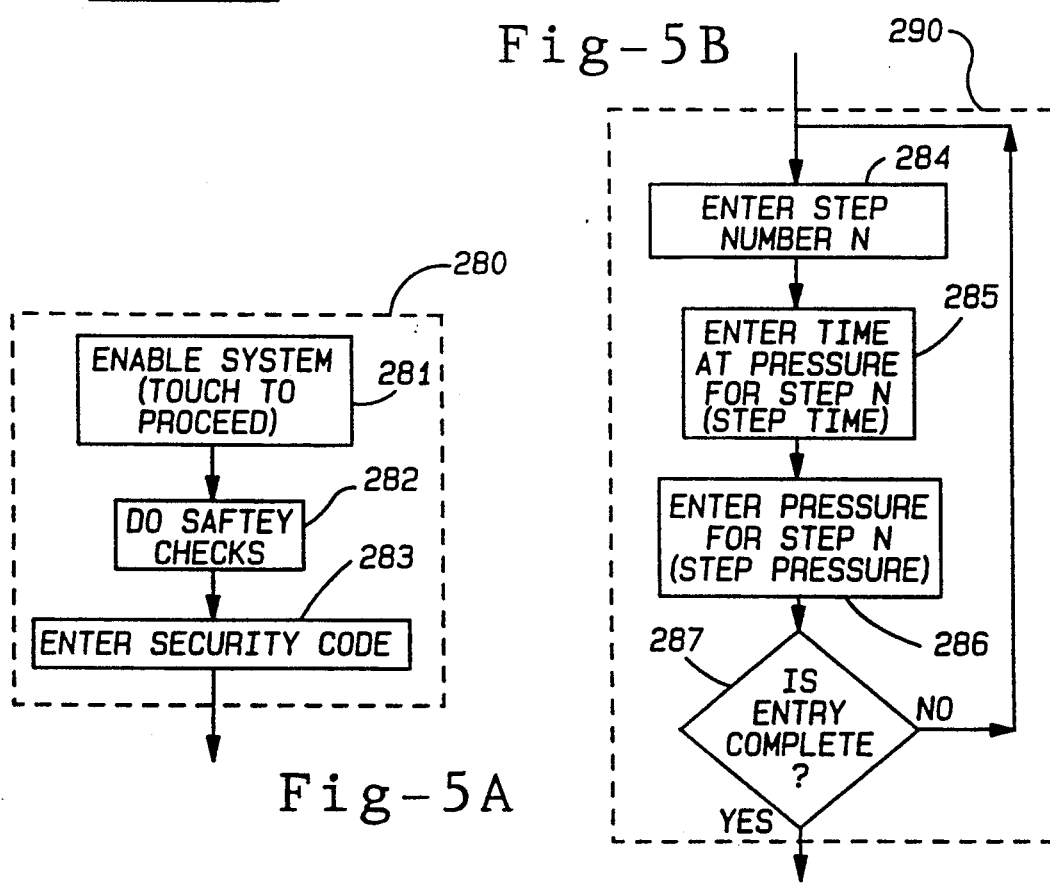
Fig-5A
Fig-5B

APPARATUS FOR GAS ASSISTED INJECTION MOLDING HAVING PRECISE CONTROL OF INJECTION AND HOLDING PRESSURE WITH STEPPED HOLDING PRESSURE CAPABILITY

RELATED UNITED STATES PATENT APPLICATION

This application is a continuation-in-part of co-pending United States Patent Application Ser. No. 07/628,746 filed on Dec. 17, 1990 now U.S. Pat. No. 5,200,127 and entitled "Method and Apparatus for Gas Assisted Injection Molding."

BACKGROUND OF THE INVENTION

1. FIELD OF THE INVENTION

The present invention relates to gas assisted injection molding and to a gas control system for use in a gas assisted injection molding system. More particularly, the invention relates to a method and apparatus for gas assisted injection molding which has the ability to inject a shot of molten plastic into an injection mold, shut off the plastic flow, and inject a gas at a first predetermined and precisely control pressure into the melt, either almost instantaneously or after a delayed time. The present invention then has the ability to step up and/or step down and/or hold the gas under pressure in an almost infinite variety of patterns while the plastic is cooling in the mold, finally arriving at a step down or controlled vent pressure when the part is sufficiently cooled to be self-supporting, followed by opening the mold and removing the article.

2. DESCRIPTION OF THE PRIOR ART

The history of injection molding as a manufacturing process is relatively recent compared to some other manufacturing methods. In the infancy of injection molding, articles were generally produced by injecting a molten plastic or resin material into a mold cavity, and letting the material cool to form a molded article, at which time the mold cavity was opened and the article was released.

As the art of conventional injection molding advanced, attempts were made to make larger and larger parts. It become evident that there were many restrictions on the ability of conventional injection molding in some of these applications. Some restrictions which were found the impossibility to match, while molding a part, different factors as the presence of large, flat surfaces, diverse and heavy wall sections and exceptionally long flows with the need for acceptable physical properties, good productivity and investment levels, and an aesthetically pleasing surface finish.

These considerations were found to be particularly relevant in the electronics industry, where there was the need for enclosures for television sets, computers, printers and the like; in the home furnishings industry, where there was a need for large parts for garden chairs and tables, bathroom furnishings, and the like. Also presenting a problem were tools, handles and machinery components in general, and in the automobile industry in particular. A particularly aggravating problem was the tendency of sink marks to appear opposite large or thick rib sections. This led those skilled in the art to devise a method and apparatus capable of generating a pressure inside the molded component in addition to the injection pressure exerted by the machine at the injection point.

One solution that proved satisfactory for some injection molded parts was the use of structural foams. Processes for structural foam molding date back to the 1960s. In the structural foam molding process, a gas and polymer mixture is injected inside the plasticizing barrel on the nozzle of the injection molding machine. Once injected, the gas expands and forms cavities which are generally closed cells in which gas is entrapped. The structural foam injecting process reduces internal stresses and surface sink marks, and permits a reduction in the weight of the material used. However, for some applications, it was found that gas bubbles could migrate to the surface and burst therethrough, resulting in the unsuitability of the foam process for certain parts. Also, the cycle time is longer and special molds need to be used. Therefore, the foam injection molding process remained unsatisfactory for many applications, and those in the art continued their search to find a satisfactory method of injection molding for use on large and-/or complicated parts.

In order to solve the problems in the injection molding art which could not be solved with structural foam molding and other methods, several in the art developed the process of gas assisted injection molding. In gas assisted injection molding, unlike structural foam molding, the cavities formed in the molded component remain in connection with the injection point of the gas. In such a process, the mold is filled with molten plastic or synthetic resin molding material which, in many processes, is less than the volume which is necessary to fill the mold. The filling of the mold is completed by the injection of a gas into the molding material contained in the mold. This results in the formation of a cavity or cavities within the molding material. The pressure of the injection gas compresses or packs the melt against the mold walls during the curing state, resulting in the elimination of sink marks opposite thicker sections or ribs and the like.

Many variations of the gas assisted injection molding process are present in the prior art. For example, U.S. Pat. No. 4,106,617 requires a "sprue break" for venting the gas out of the part before opening the mold. U.S. Pat. No. 4,106,887 requires gas to be injected through a needle valve within a runner which is movably mounted and engagable in the cavity gate. U.S. Pat. No. 4,140,672 provides for the injection of viscous liquid which, at room temperature, is either a grease or solid. U.S. Pat. Nos. 4,136,220 and 4,247,515 relate to the formation of a structural web type material. U.S. Pat. No. 4,498,860 relates to a movable ram associated with the cavity gate which is used to cut off the sprue. U.S. Pat. Nos. 4,830,812 and 4,913,644 relate to cutting members within the mold body that are used to vent the pressurized gas. U.S. Pat. No. 4,923,666 relates to a method wherein the cavity is fully packed with resin before gas injection, and gas cavities are formed only in areas in which there is significant shrinkage.

U.S. Pat. No. 4,923,677 requires a gas venting passage separate from either the resin or gas injection passages. U.S. Pat. No. 4,943,407 requires that gas injection be through the sprue bushing. U.S. Pat. No. 4,944,910 requires a simultaneous injection of the resin and gas during the molding cycle, while U.S. Pat. No. 4,948,547 requires that the injection gas is confined to the resin flow path, and that it does not enter the article defining area. And finally, U.S. Pat. No. 5,028,377 requires a flow path at least partially defined by a movable member wherein the pressure of the molten plastic can be reduced in a controlled manner by moving the movable member prior to gas injection.

Also, various types of control systems have been developed in the prior art to control the pressure of the injection gas. U.S. Pat. No. 4,824,732 requires a variable volume chamber for gas storage and control. The gas is injected at a controlled rate by reducing the volume of the variable volume chamber. U. S. Pat. No. 4,855,094 requires the injection of the gas at a predetermined pressure no greater than the resin injection pressure. U.S. Pat. No. 4,935,191 requires that both the resin and the gas be injected simultaneously for at least a portion of the injection cycle. And U.S. Pat. No. 5,015,166 provides for a control system for supplying a variable volume of a gas art at a predetermined pressure and maintaining that pressure at a substantially constant level. All of these patents perform generally satisfactorily, but leave one or more problems in the injection molding art. Thus, those skilled in the art continued their search for a satisfactory gas assisted injection molding method and apparatus.

Applicants have found, as more fully explained in co-pending patent application Ser. No. 07/628,746, filed on Dec. 17, 1990 and entitled "Method and Apparatus for Gas Assisted Injection Molding", that starting a flow of injection gas during the time that a flow of molten material is taking place has caused the problem of clogging of the gas supply passages due to the molten material entering and clogging the supply passage during the initial injection of molten plastic. This has involved costly down time and complicated apparatus to try and prevent the entry of the molten molding material into the gas supply system. In patent application Ser. No. 07/628,746, which is specifically incorporated herein by reference, it is shown that it is possible to sequentially first introduce a molding material into the mold cavity, and then shut off the supply of plastic. Thereafter, pressurized gas is introduced through the injection nozzle into the interior of the mold cavity, producing a satisfactory solution to the problems in the prior art.

Further work by the Applicants since the filing of patent application Ser. No. 07/628,746 has shown that it is also possible to eliminate problems and to provide a higher quality part by providing a method and apparatus which produces precise and careful control of the pressure of the injection gas during injection into the part and during the cooling process. The method and apparatus for precision control of the injection gas is preferably used in Applicants' system, wherein the gas injection is not started until after the supply of molten resin or plastic into the mold is stopped. It should be understood, however, that such system can also be used to improve the performance of other prior art gas assisted injection molding systems made by others.

SUMMARY OF THE INVENTION

To solve the problems in the prior art, and to provide for precise control of the pressure of the injection gas during injection, and while within the molded part during the cooling process, a method and apparatus for gas assisted injection molding is provided which will first inject a shot of molten plastic into a suitable mold, shut off the plastic flow into the mold, inject a suitable gas at a predetermined and precisely controlled pressure into the mold, immediately, or after a delayed time, step up or step down the pressure in the mold in a finite number of steps to arrive at a second predetermined and precisely controlled pressure, hold the second predetermined pressure for a desired time, repeat the setting and holding of pressure as many times as desired, step down the pressure to a final predetermined pressure, and open the mold and remove the article.

In a first embodiment of the invention, a method is provided wherein a quantity of molten plastic or other material is injected into a mold, the flow of molten material is shut off, and a gas is injected into the mold at a predetermined and precisely controlled pressure after a delay time ($T_1 \geq 0$). The method continues by stepping down the pressure over time to a second predetermined and precisely controlled pressure, which is held for a second time ($T_2 > 0$). A final step down of pressure to a final or controlled vent pressure is made, and the mold is opened and the article is removed.

In a second embodiment of the present invention, a method is provided whereby an amount of plastic less than is necessary to fill the mold is injected into a mold cavity. The flow of plastic into the mold is then shut off, after which a delay time may be introduced, if desired. The method continues with an injection of gas at a predetermined pressure, after which the pressure of the gas may be repeatedly increased and/or decreased in finite steps, determined by the particular application, to produce a predetermined number of hold pressures during the cool down cycle, terminating with a step down or final vent pressure which is arrived at before the mold is opened and the article removed.

In another modification of the present invention, an apparatus is provided for injecting a molten molding material into a mold cavity. Apparatus is provided to shut off the flow of material and to inject a gas, preferably nitrogen, at a predetermined and precisely controlled pressure after a delay time ($T_1 \geq 0$). Apparatus is further provided to step down the pressure to a second predetermined and precisely controlled pressure, and to hold the pressure in the part at the second predetermined pressure for a time greater than or equal to zero ($T_2 > 0$). The apparatus then has means to further step down the pressure to atmosphere, and to open the mold and remove the article.

In a still further modification of the present invention, a source of gas or gas supply at a commercially available pressure is passed through a gas booster to increase its pressure to a pressure higher than desired for the injection molding process. The gas is then filtered and passes through a conduit to a pressure regulator which has a fixed volume gas reservoir immediately upstream therefrom. The pressure regulator then lowers the gas pressure to a desired injection pressure and, at the appropriate time, the gas is passed through a fast operating valve into the mold. The flow of gas is then shut off. A computer, including a programmable logic controller (PLC), connected to the system, in addition to operating the other devices just described, operates a back pressure regulator to step up and step down the gas pressure in the mold, as desired, until such time as the part has cooled, the pressure has been lowered to a final vent pressure, and the mold is opened.

Thus, it is one of the objects of the present invention to provide a method of gas assisted injection molding where the pressure of the injection gas can be closely controlled.

It is another object of the present invention to provide a method and apparatus for gas assisted injection molding where the pressure of the gas in the mold during the mold cooling process can be closely controlled.

Another object of the present invention is to provide a method for gas assisted injection molding wherein a short shot of plastic molding material is introduced into the interior of a mold cavity, the flow of plastic molding material is stopped, a gas is injected into the interior of the mold cavity to form a cavity or channel in the part being molded, and the pressure of the injection gas in the gas cavity is stepped up and/or held and/or stepped down, as needed, to provide a finished part of optimum quality.

A still further object of the present invention is to provide a gas assisted injection molding process where the close control of gas pressure in the part being molded will serve to reduce molding stress and warpage.

A still further object of the present invention is to provide a gas assisted injection molding process which provide improved elimination of sink marks.

A still further object of the present invention is to provide an apparatus for gas assisted injection molding which will inject a shot of molten plastic or synthetic resin into the interior of a mold cavity, cut off the flow of molten plastic or synthetic resin, inject a gas into the interior of the molten plastic or synthetic resin to form a cavity or channel in the interior thereof, control the pressure of the gas inside the part until such time as the part has cooled sufficiently to be self supporting, and then allow the mold to be opened and the part released.

Another object of the present invention is to provide an improved apparatus for injection molding which will inject a short shot of molding material into the interior of a mold cavity, cut off the flow of molding material, inject a gas at a first predetermined pressure into the mold cavity thereby forming a gas cavity within the part being molded, and step up and/or step down and/or hold the gas pressure in the mold as needed, depending upon the particular application, to provide a molded part of optimum quality.

Further objects and advantages of this invention will be apparent from the following description and appended claims, reference being had to the accompanying drawings forming a part of the specification, wherein like reference characters designate corresponding parts in the several views.

BRIEF DESCRIPTION OF THE DRAWINGS

FIGS. 5, 5A, 5B, and 6 illustrate computer flow charts showing the steps which can be used by the computer or control means utilized in the present invention to control the process of the present invention.

It is to be understood that the present invention is not limited in its application to the details of construction and arrangement of parts illustrated in the accompanying drawings, since the invention is capable of other embodiments, and of being practiced or carried out in various ways within the scope of the claims. Also it is to be understood that the phraseology and terminology employed herein is for the purpose of description, and not of limitation.

DETAILED DESCRIPTION OF THE PREFERRED EMBODIMENTS

In the method of the present invention, a full or short shot of molten plastic is injected into the mold cavity. A short shot of molten resin or plastic is to be understood to be an amount less than the volume of the mold cavity. Preferably an amount equal to about 60 to 90 volume percent of the amount of plastic necessary to fill the mold is injected. While a full shot (i.e., the amount necessary to completely fill the mold cavity) may be injected, as used in some gas assisted injection molding machines, in the preferred embodiment of the present invention, a short shot is used.

Figure 1:
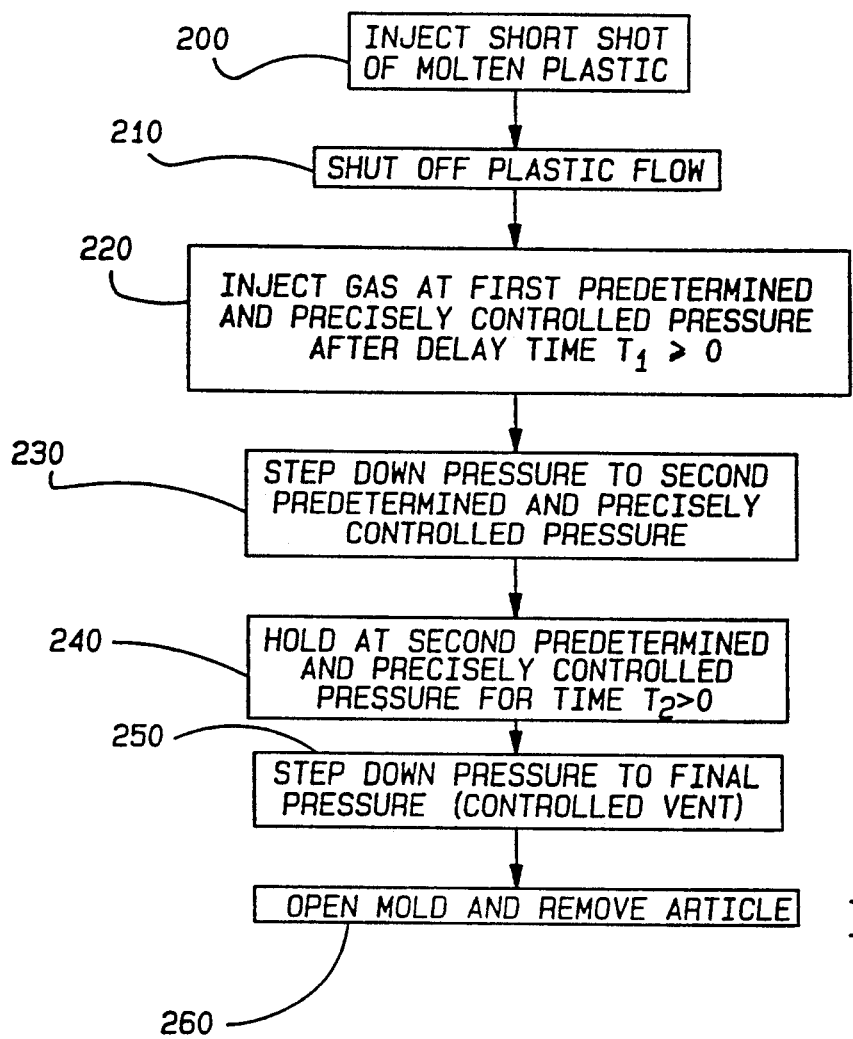
FIG. 1 is a flow chart showing the steps followed by the process or method of the present invention.
Figure 2:
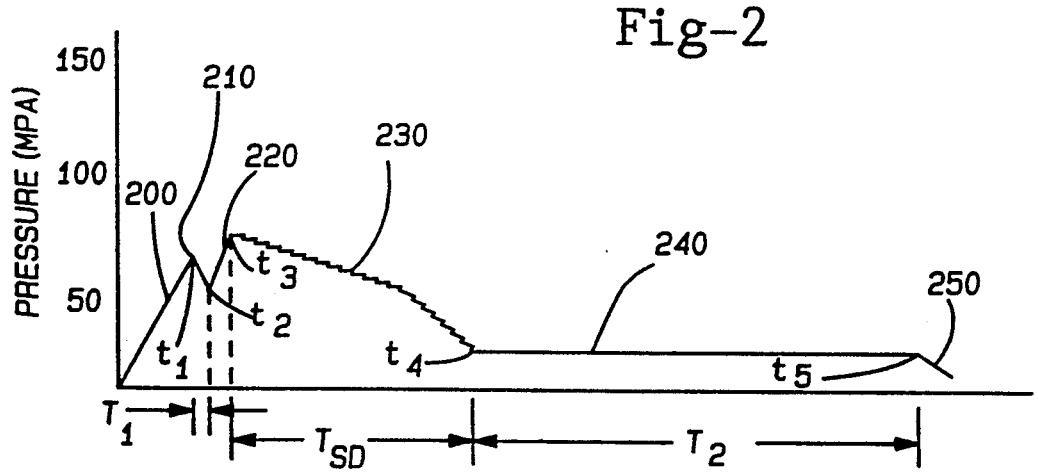
FIG. 2 is an illustrative graph showing the changes of pressure with respect to time used in the process and apparatus of the present invention.

Referring now to FIGS. 1 and 2, the steps used in the method of the present invention can be understood. It should be understood that the numbers applied to the boxes shown in FIG. 1 will correspond to the numbers applied to certain portions of the pressure versus time graph shown in FIG. 2. An injection molding apparatus of a type well known in the art, which may be such as used in the injection molding apparatus previously described, or in patent application Ser. No. 07/628,746, will inject a full shot (not shown) or a short shot of molten plastic (step 200) during the time zero to $t_1$ shown in the graph of FIG. 2. At time $t_1$, the supply of plastic or other molding material is shut off (step 210). After the plastic flow is terminated and following a delay time $(T_1=(t_2-t_1))$, a gas at a desired injection pressure is injected into the plastic material in the mold cavity (step 220). The delay time is generally in the range of about 0 to 60 seconds. The gas pressure within the mold will increase until time $t_3$, at which point the gas pressure is equal to the first predetermined and precisely controlled pressure. The actual injection duration (i.e., $t_3-t_2$ in FIG. 2) is usually in the range of 0 to 60 seconds and more often in the range of just a few seconds.

Next, the pressure inside the mold cavity is stepped down or lowered during a time $T_{SD}$ (i.e., $t_4-t_3$ in FIG. 2) in a predetermined series of steps to be more fully explained hereinafter (step 230). The time $T_{SD}$ is also generally in the range of 0 to 60 seconds. At time $t_4$, the pressure is held at the second predetermined and precisely controlled pressure for a time $T_2$ (i.e., $t_5-t_4$ in FIG. 2) (step 240). At time $t_5$, the gas pressure is stepped down to a final pressure or controlled vent pressure (step 250), which is usually atmospheric pressure or slightly above atmospheric pressure, after which the mold can be opened and the article removed (step 260).

The apparatus to be described hereinafter is capable of, or can readily be modified to be capable of, stepping down (or, if desired, stepping up) the pressure in as many as 100 steps or more using a series of timers in a programmable logic controller. More or less steps may be used, depending upon the particular application, and the full capacity of the apparatus does not have to be used in every application. Generally, it is preferred that the number of steps in which the pressure is dropped is in the range of about 10 to 25 steps, and more preferably about 20 steps. It is well within the scope of the present invention to provide an apparatus which can provide for over 20 steps, if needed or desired.

It should be understood that the pressure versus time graph of FIG. 2 is an illustrative example only, and that depending on the specific application, many other pressure/time relationships may be suitable and even preferred. For example, it is possible that the pressure can be increased or stepped up for some steps during the time period $T_{SD}$ before being lowered in a stepwise fashion to the second predetermined pressure. Or, if desired, the pressure can be lowered in a stepwise fashion from the second predetermined pressure to the final venting pressure. As one skilled in the art will realize, many other pressure/time patterns can be employed within the scope and spirit of this invention.

It should be further understood that the method and apparatus of the present invention are usable with any of the aforementioned gas assisted injection molding systems, whether the plastic is injected into the mold cavity through an injection pin, through a runner, or through a nozzle.

Also, the method and apparatus of the present invention are usable whether or not the injection of the gas starts after the flow of molding material is completely shut off, or while some of the molding material is still flowing into the mold or mold cavity. Generally, however, it is preferred that a gas assisted injection molding system is used where the plastic and the pressurized gas are both injected into the mold cavity through a nozzle. It is also generally preferred that the pressurized gas is injected after the flow of molding material has been shut off. More preferred is a gas assisted injection molding system wherein the nozzle contains a valve means for controlling the flow of both plastic and pressurized gas. Suitable nozzles with valve means include those described in U.S. patent application Ser. No. 07/628,746 filed on Dec. 17, 1990, U.S. patent application Ser. No. 07/714,117 filed on Jun. 12, 1991, and U.S. patent application Ser. No. 07/714,118 filed on Jun. 12, 1991, all of which are hereby incorporated by reference. As one skilled in the art will realize, the gas control system of the present invention can also be used with other gas delivery systems. One such other gas delivery system is described in U.S. patent application Ser. No. 07/724,044 filed Jul. 1, 1991, which is hereby incorporated by reference. In this last listed Patent Application, the pressurized gas is introduced through either the nozzle or the sprue bushing using a cone-shaped check valve which prevents the flow of molding material back into the pressurized gas passageways.

Figure 3:
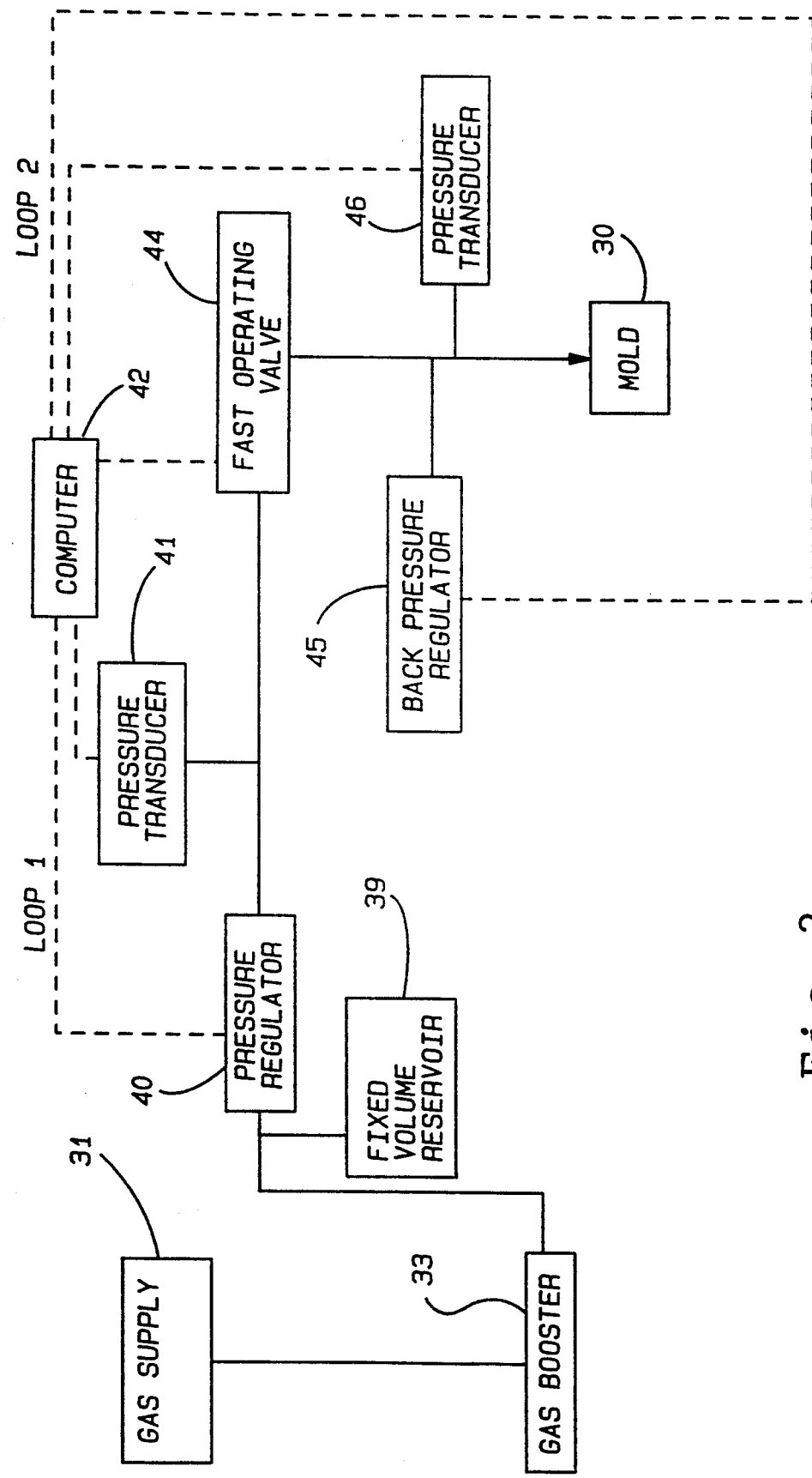
FIG. 3 is a diagrammatic view of an apparatus embodying the present invention.

Referring now to FIG. 3, a diagrammatic view of an apparatus embodying the construction of the present invention is shown. A gas supply or source of injection gas 31 is placed in fluid communication with a gas booster 33 to raise the pressure of commercially available gas supplies to a pressure higher than a desired injection pressure. A gas booster 33, which may be such as the AGT-62/152C gas booster manufactured by Haskel Incorporated of Burbank, Calif., will increase the injection gas pressure from the commercially available pressure of the gas supply or source of injection gas (i.e., about 500 to 2,500 psi), to a significantly higher pressure, preferably about 8,000 to 13,000 psi, and more preferably about 12,000 to about 13,000 psi.

Downstream of the gas booster 33 is a fixed volume gas reservoir 39 which, in the preferred embodiments of the present invention, has a volume of approximately 10 to 100 cubic inches, and preferably about 15 to 25 cubic inches, and most preferably about 20 cubic inches. The combination of the high pressures generated by the gas booster 33 and the fixed volume reservoir 39 perform an important function in the preferred embodiment of the present invention, as will be explained in detail hereinafter in connection with the description of FIG. 4.

Downstream of the fixed volume reservoir 39 is a pressure regulator 40 which may be the same as the ER series of electronic pressure regulators manufactured by the TestCom Corporation of Elk River, Minn., or its equivalent. The use of an electronic regulator is preferred to allow computer control of the system. The purpose of the pressure regulator is to reduce the pressure of the injection gas from a pressure higher than a preferred or desired injection pressure to the first predetermined or desired injection pressure. In the preferred embodiment of the invention, the pressure will be reduced from the gas-boosted pressure of approximately 12,000 to 13,000 psi to the preferred or desired injection pressure of about 1,000 to 6,000 psi. The actual injection pressure selected will depend, in large part, upon the plastic used, the mold cavity size, and related parameters; such a selection of the appropriate injection pressure is within the skill in the art of gas assisted injection molding.

A first pressure transducer 41 downstream and in fluid communication with the pressure regulator 40 provides feedback to the pressure regulator via computer 42 to enable the system pressure to be maintained at the desired value. The pressure transducer 41, the pressure regulator 40, and the computer 42 form a first control loop (LOOP 1) for controlling and adjusting the gas pressure to the first predetermined and precisely controlled pressure. This first predetermined and precisely controlled pressure is the initial pressure of the gas upon injection into the molten plastic within the mold 30.

Important to the preferred embodiment of the method and apparatus of the present invention is the fast operating valve 44 located between and connected to the pressure regulator 40 and the mold 30. Since, in the preferred embodiment of the invention, a method of gas assisted injection molding is utilized where a short shot of plastic is first injected into the mold, the plastic flow into the mold is stopped, and the pressurized or injection gas is injection into the mold cavity, the speed at which the gas reaches the pressure necessary to break into the hardening resin is important. In larger parts, or for difficult to mold materials, if the break-through or preferred injection pressure is not reached quickly, it may become difficult or impossible to inject the gas into the plastic within the mold.

It is, therefore, preferred that the fast operating valve of the present invention be fully opened from its normally closed position in about 1/10th to 3/10ths of a second (or faster). This requires careful selection of the valve for the present invention. One valve which has been found to be especially satisfactory is the "SNO-TRIK" Model SS-410-FP-C valve, which is manufactured by the SNI-TRIK Company of Cleveland, Ohio. Another suitable value is a Whitey Model SS-H83P54-31C available from Whitey Company of Highland Heights, Ohio; based on the manufacturer's specifications, this valve is also expected to be especially satisfactory. The fast operating valve 44 should open and very quickly supply fully pressurized injection gas to the mold 30. A second pressure transducer 46 is connected to, and in fluid communication with, the fast operating valve 44 downstream thereof, and is electrically connected to the computer 42. A back pressure regulator 45 is also connected to, and in fluid communication with, the fast operating valve 44 and the mold 30. The back pressure regulator 45 is electrically connected to the pressure transducer 46 via the computer 42, thereby providing a second control loop (LOOP 2) for control of the gas pressure in the mold cavity after the flow of plastic or resin molding material is stopped and the pressurized gas has been injected. Thus, the second control loop is used to control the pressure of the gas within the mold during the pressure step down procedure, the holding pressure procedure, and the venting procedure (steps 230, 240, and 250, respectively, in FIG. 2).

Figure 4:
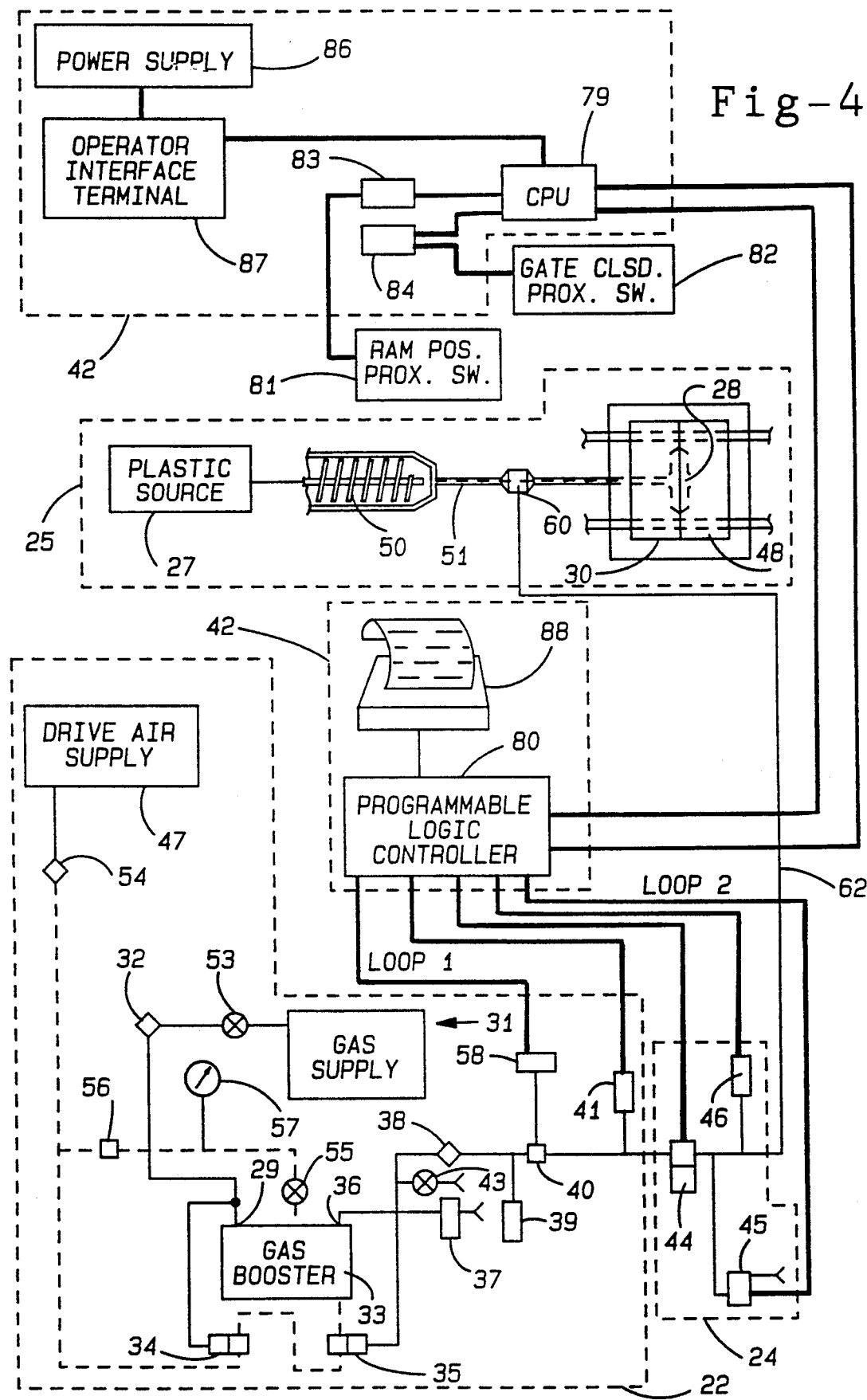
FIG. 4 is a detailed schematic view of an apparatus embodying the present invention.

Referring now to FIG. 4, a schematic diagram representative of a preferred embodiment of the present invention is shown. This preferred embodiment comprises four basic parts: (1) an injection molding machine 25, (2) a gas booster system 22, (3) a gas injection consol 24, and (4) a computer system 42. The injection molding machine 25 has a plastic source, hopper, or source of molding material 27, (i.e., thermoplastic, resin, or the like) communicating with an injection ram 50. Injection ram 50 plasticizes, heats, or otherwise transforms materials contained in the hopper or source of plastic 27 into a molten resin or plastic molding material which is transmitted by conduit 51 to the mold 30 which contains a mold cavity 28. Pressurized gas of a predetermined pressure is injected into the molten resin and the mold cavity 28 through gas injection point 60. The pressure of the injected gas is controlled as described in detail below.

A source of injection gas or gas supply 31, which may consist of a plurality of gas cylinders (not shown) or a bulk gas storage system (not shown) is provided as part of the gas booster system 22. The injection gas preferably is nitrogen because it is inert and relatively inexpensive, but other gases (e.g., air, argon, carbon dioxide, and the like) may be used, if desired.

The gas supply 31 is in fluid communication, through gas valve 53, with a first or inlet filter 32 for removing impurities in the gas steam which might damage the gas booster 33. Conventional gas filters may be used (e.g., model number 28728-1 manufactured by the Haskell Manufacturing Company). Gas filter 32 is connected to the inlet 29 of the gas booster 33.

A supply of compressed air is used to drive the gas booster 33. The compressed air supply 47, which may be building air supply or directly from a compressor, is connected through air filter 54, normally open shut off valve 55, and regulator 56, to the gas booster 33. Air pressure gage 57 allows the operator to observe the air pressure delivered to the gas booster.

The compressed air supply 47 is also used to operate the first pilot switch 34 and the second pilot switch 35 by means well known in the art. Instructions for the connection of first pilot switch 34 and second pilot switch 35 are normally supplied by the manufacturer of the gas booster 33. In the preferred embodiment of the invention, the first pilot switch 34 is a decreasing pilot switch which will deactivate the gas booster 33 if the pressure of the gas supply 31 to the booster falls below about 500 psi. Deactivation of the gas booster 33 in such cases is designed to prevent damage to the gas booster. The second pilot switch 35 is an increasing pilot switch which is set to vent excess pressure if the pressure of the gas exiting the gas booster is greater than a set value.

The outlet 36 of the gas booster is connected to both the second pilot switch 35, the pressure relief valve 37, the manual relief valve 43, and the second gas filter 38. The pressure relief valve 37 is used, in combination with the second pilot switch 35, to vent any excess pressure generated by the gas booster 33. A suitable pressure relief valve 37 is available from Haskell Manufacturing Company as model number 15700-25. The relief valve 37 should automatically release excess pressure from the system if the second pilot switch 35 fails to prevent the gas booster 33 from generating pressures in excess of the generally preferred 12,000 to 13,000 psi range. In the preferred embodiment of the present invention, the second pilot switch 35 and the relief valve 37 are set at about 500 psi higher than the desired gas boosted pressure (e.g., if the gas booster is to deliver a pressure of 13,000 psi, the second pilot switch 35 and the relief valve 37 would be set at 13,500 psi). The manual relief or bleed valve 43 is also provided as a safety feature which allows the operator to quickly vent or depressurize the system in the event of a malfunction or to vent or depressurize the system to perform maintenance.

The second filter or outlet filter 38 is in fluid communication downstream with the fixed volume reservoir 39. Downstream of reservoir 39, the pressure regulator 40 reduces the pressure from the gas booster 33 to a desired injection pressure of about 1000 to 6,000 psi. The pressure regulator 40 is also connected by suitable electrical connections to the electro pneumatic controller 58 which forms part of the pressure regulator 40. First pressure transducer 41 is provided downstream of the pressure regulator 40, and in fluid communication therewith. The first pressure transducer 41 is also electrically connected to the programmable logic controller (PLC) 80 of the computer or control means 42. A first control loop (LOOP 1) is established between the PLC 80, the first pressure transducer 41, and the pressure regulator 40 (and its electro pneumatic controller 58) to control the pressure of the injection gas to a predetermined and precisely controlled or desired injection pressure. The electro pneumatic controller 58 is connected to and driven by a source of low-pressure nitrogen (generally about 170 psi) for control purposes, as is well known in the art.

The pressure regulator 40 is connected to the fast operating valve 44, such as the SNO-TRIK or Whitey fast operating valves described above (or their equivalent), which will remain normally closed until the system is ready to inject gas into the mold 30. The fast operating valve 44 is electrically connected to the PLC 80 to receive a signal therefrom at the appropriate injection time. When the signal is received, the fast operating valve 44 opens and injects, via gas line 62, a quantity of pressurized gas into the resin or plastic contained in mold cavity 28 until a first predetermined and precisely controlled pressure is reached. Since the fast operating valve 44 will remain open until the desired pressure within the mold cavity 28 is reached, the actual time the valve remains open ($(t_3 - t_2)$ in FIG. 2) will vary depending upon the application, and may even vary from cycle to cycle because of such variables as temperature and pressure. It is generally preferred that the gas line 62 between the fast operating valve 44 and the injection point 60 be as short as possible to allow injection of the pressurized gas as quickly as possible. The desired pressure will be initially programmed into the PLC 80 by the operator depending on the application, and then will be controlled by the control means 42 thereafter.

The combination of the high pressure provided by the gas booster 33 and the fixed volume reservoir 39 should prevent, or at least minimize, significant gas pressure drop when the fast operating valve 44 opens. As noted above, the volume of the fixed volume reservoir 39 is normally in the range of about approximately 10 to 100 cubic inches, and preferably about 15 to 25 cubic inches, and most preferably about 20 cubic inches. The volume of the fixed volume gas reservoir 39 should be large relative to the cumulative volume of the associated gas lines or passageways between the gas booster 33 and the mold cavity 28 so that, for example, when the first control loop calls for additional pressure or the fast operating valve 44 is opened, there is only a relatively small change in volume, and therefore pressure, experienced by the pressurized gas in the fixed volume reservoir. Thus, as one skilled in the art will realize, if the volume of the associated gas passage ways is increased (e.g., by increasing the length of the passage ways between components) or if a part with large volume gas channels is to be made, it may be necessary to increase the volume of the fixed volume reservoir 39. Limiting the pressure drop in this manner will allow for pressure control with only minimal "over shooting" or "under shooting" of the "set" or desired pressure.

The second pressure transducer 46 and the back pressure regulator 45 are connected to each other via the PLC 80 to form a second control loop (LOOP 2). This control loop controls the pressure in the mold cavity 28 during the step down and pressure holding steps. This control loop can also be used to increase the pressure, if desired, in the mold cavity 28 (i.e., stepping up the pressure). If the pressure is to be increased, the computer 42 signals the fast operating valve 44 to open, thereby increasing the pressure in gas line 62. This second control loop is also used for controlled venting (250 in FIG. 2). In controlled venting, the pressurized gas is vented from the mold cavity 28, via gas passageway 62, through the back pressure regulator 45. Normally, the gas is vented to atmospheric pressure at the completion of the molding cycle. In such a case, the pressure within the plastic molded part will be at atmospheric pressure. In some cases, however, it may be desirable to have residual gas pressure within the mold plastic article. In such cases, the gas should be vented to the desired residual pressure (e.g., 20 to 50 psi) using the second control loop and then, while holding the desired pressure, injecting a small quantity of resin to "seal" the molded plastic part so it can retain a positive gas pressure when, after the "plastic seal" has hardened, the molded part is removed from the mold.

In order to begin the injection cycle it is necessary, primarily for safety reasons, to determine whether the injection ram 50 has come home and whether the safety gate 48 has closed. In accomplish this, a ram proximity switch 81 is connected through first relay 83 to the central processing unit (CPU) 79 of the computer 42. A gate closed proximity switch 82 is connected through second relay 84 to CPU 79. When relays 83 and 84 both send the appropriate signals to CPU 79 the injection cycle can begin. The safety gate 48 is a plexiglass or similar shield that encloses the injection ram 50 and the mold 30 during the actual injection process, thereby shielding and protecting the operator in case of any sudden or unexpected pressure release or blow-out during the injection molding cycle.

Figure 7:
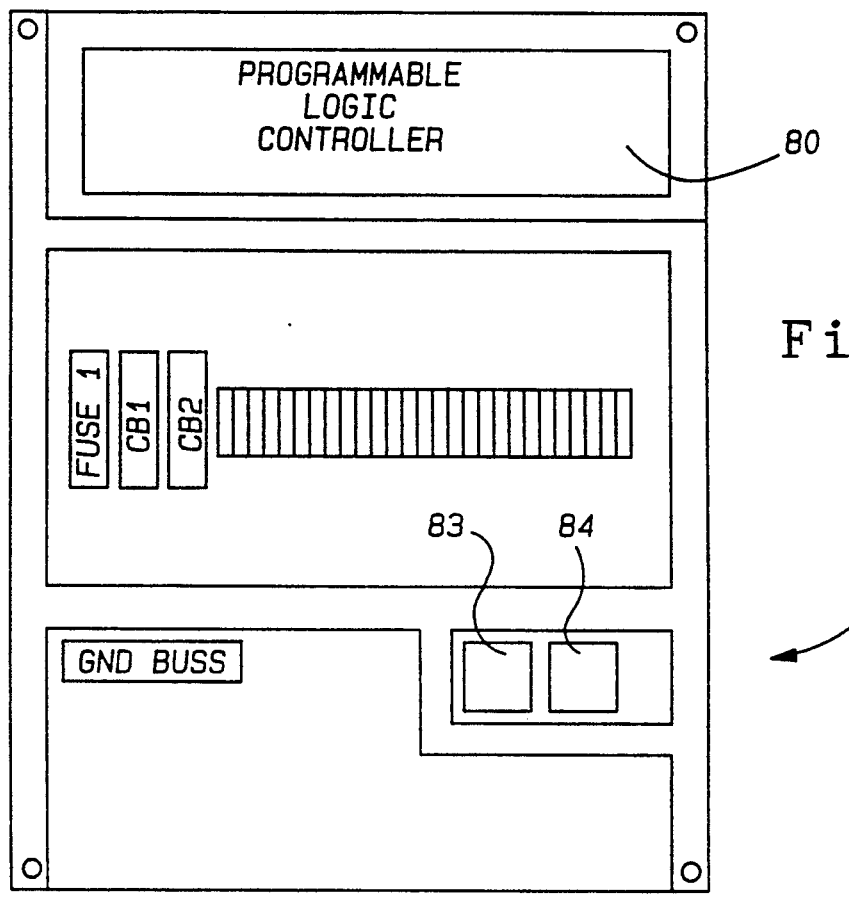
FIG. 7 is a diagrammatic view showing specific portions of the computer console, including the programmable logic controller, used in the operation of the present invention.
Figure 8:
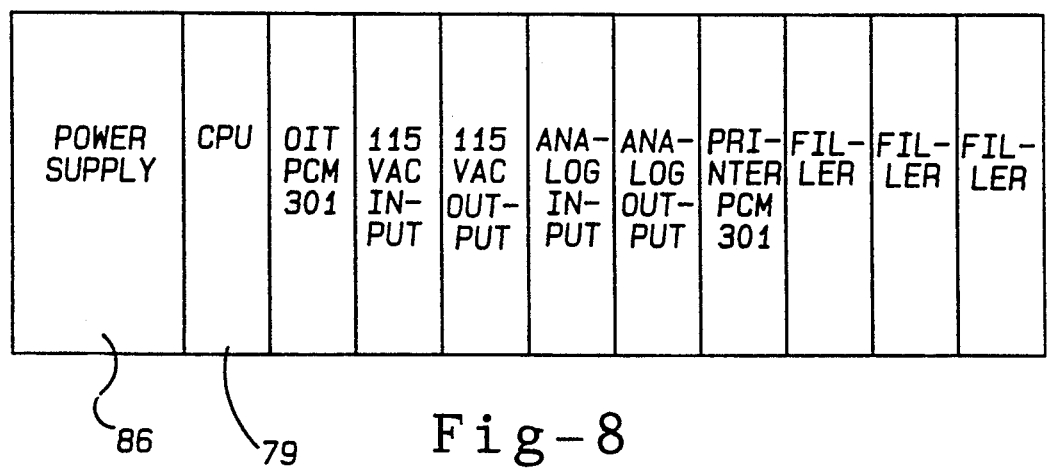
FIG. 8 is a view showing the card arrangement for the programmable logic controller shown in FIG. 7.

The computer or control means 42 includes a power supply 86 connected to an operator interface terminal 87 which is connected to the CPU 79. In the preferred embodiment of the invention, the operator interface terminal 87 is the miniature operator interface terminal or "MINI OIT" manufactured by GE Fanuc Automation North America, Inc. of Charlottesville, Va. The operator interface terminal 87 is connected via CPU 79 to the programmable logic controller 80, which also may be such as that made by GE Fanuc Automation North America. It is preferred that the operator interface 87 is a "touch sensitive" CRT unit for ease of control, although other devices such as hardware switches, keyboards, and the like can be used. The arrangement of the programmable logic controller and various cards needed for the operation of the control means is shown in FIGS. 7 and 8. If desired, a printer 88 may be connected to the PLC 80 for printing out operator reports. As those skilled in the art will realize, many commercially available computer systems or computer components can be used as the control means 42.

Referring now to FIGS. 5, 5A, 5B, and 6, there are shown flow charts generally illustrating computer software procedures which can be used to operation the apparatus and method of the present invention. As those skilled in the art will realize, many other computer flowcharts as well as many different computer programs or sets of computer software instructions could be used to preform essentially the same or very similar steps illustrated in these flow charts.

In an preferred embodiment there is provided an automatic mode of operation and a manual mode of operation. The automatic mode is used for normal operations. The manual mode is used for determining various operational parameters and for diagnostics and system evaluations (e.g., clearing gas or plastic lines associated with the mold 30). In either mode of operation, the operator must first enable the system (block 280), and then enter (block 290) the desired values for injection pressure and the duration or time at each pressure for all of the individual steps by which the injection or first desired and precisely controlled pressure is stepped down to the second or subsequent predetermined desired pressure (auto mode) or the gas pressure (manual mode). The programmable logic controller 80 provides for the stepping down to the second predetermined and precisely controlled pressure in a plurality of individual steps (in a most preferred embodiment, about 20 steps are used). As discussed above, more or fewer than 20 steps may be used if desired, and by virtue of the fast opening valve 44, the pressure inside the mold cavity 28 may be stepped upwardly as well as downwardly during the pressure step down cycle (i.e., during time $T_{SD}$ in FIG. 2).

Referring now to FIG. 5A, the enable subroutine (block 280) is further described. Using a touch sensitive screen or CRT (i.e., a preferred operator interface terminal 87) provided on the control means 42, the logo or enable screen will first present itself to the operator with a message "touch to proceed" (block 281). After activating the "enable" screen, a safety check screen will appear (block 282). The safety checks will vary depending on the particular process being used. Generally these safety checks will involve an evaluation of various temperatures and pressures throughout the injection molding system to determine if they are within acceptable limits. Both the safety checks and the safe operating limits can be, if desired, modified by a computer programmer.

The operator will next be required to enter a security code or password (block 283). Normally two levels of security are provided. Level I, the lowest security level, simply allows the system to run without the ability to modify or change the operational parameters. Level II allows, in addition to running the system, an operator to modify an existing set of operational parameters or to set up a new set of operational parameters. If desired, additional security levels could be provided. An operator entering Level I security automatically bypasses the "enter values" subroutine (block 290) and proceeds directly to the selection of the appropriate mode of operation (i.e., automatic or manual operation). For Level I operation it is necessary that the values called for in the "enter values" subroutine have already been entered and remained stored within the computer memory or on a machine readable device such as a computer disk or punched tape. For the Level II operator, the "enter value" subroutine can be bypassed if the desired operating parameters are already available in the system. (The flow charts do not illustrate bypassing the "enter value" subroutine in order to simplify the flowcharts. Such conventional programming techniques are well within the skill of the art.)

Operating parameters can be modified or entered initially into the computer system through the "enter value" subroutine 290 by a Level II operator. Three values or parameters are required in the auto mode for each step in the stepwise reduction of the pressure and for the holding pressure indicated in FIG. 2 by the numerals 230 and 240, respectively. (As one skilled the art will realize, the holding pressure or step 240 in FIG. 2 is of the same character as the steps 230 in that figure except that the length of time at the holding pressure is much longer. Similarly, the venting cycle 250 can also, if desired, be treated as just another step or other steps. Thus, the parameters associated with the holding condition 240 will be of a similar nature and will be inputted in the same way as the parameters associated with the steps 230. And similarly for parameters associated with controlled venting 250.)

The three required values include (1) the step number (block 284), (2) the total time at pressure for each step (block 285), and (3) the pressure for each step (block 286). The loop in the "enter value" subroutine 290 will be repeated as many times as is necessary to set up the process (i.e., for N total steps the loop will be repeated N times). For each step, the operator will first enter step number N (block 284), then the time ("step time") that the pressure is to be held for that step (block 285), and lastly, the pressure ("step pressure") for a particular step (block 284). The step number N is an integer which identifies the order of the various steps. Assuming there are twenty steps, N will be equal, in turn as each data entry loop is completed, to 1, 2, 3 ... 20. Data entry will continue through block 287 and its associated loop back to block 284 until the appropriate data has been entered for all N steps.

After completion of data entry or if the data entry subroutine was bypassed, the operator must select between the auto mode (blocks 300, 330, and 340 in FIG. 5 and all of FIG. 6) and the manual mode (blocks 310, 350, 360, and 370 in FIG. 5).

Figure 6:
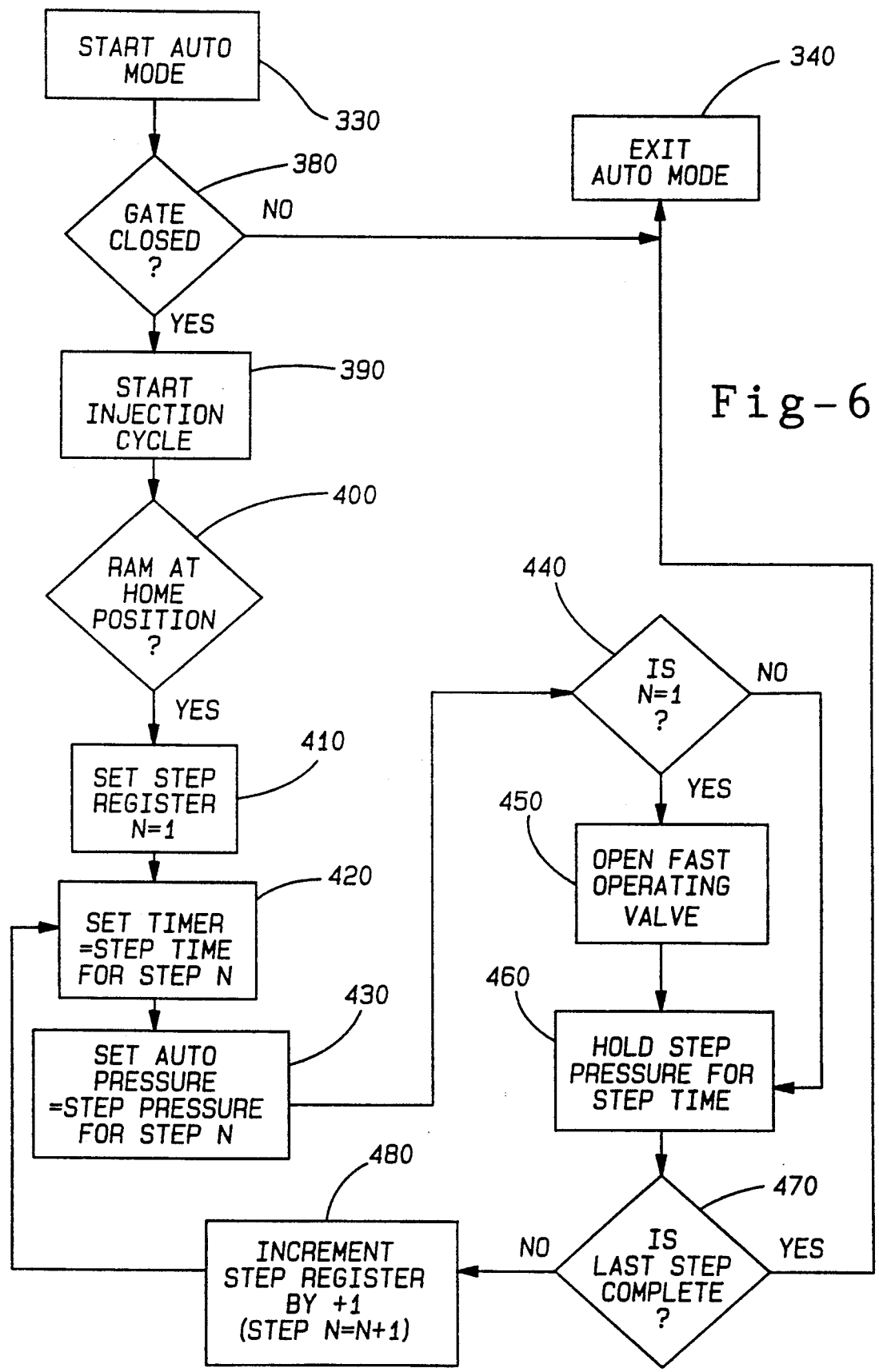

The auto mode of operation (block 300) is used for normal operation of the gas assisted injection molding system and is illustrated in FIG. 6. After beginning the auto mode (block 330), it must first be determined if be safety gate 48 is closed (block 380). If the safety gate is open, the auto mode cannot begin and the system will exit from the auto mode (block 340). If the safety gate is closed (block 380), the injection cycle can begin (block 390) thereby beginning the injection of the molten or plastic resin. Once the injection of molten or plastic resin is complete (i.e., the injection ram is at the home position) (block 400), the injection cycle for injection of the pressurized gas begins. Thus, two conditions must be met before pressurized gas injection can begin: (1) safety gate is closed (block 380) and (2) injection of the molten or plastic resin is complete (block 400). Although not shown on the flow chart, the gate closed proximity switch 82 forms an interlocking system such that, if at any time during the injection cycle (for either resin or pressurized gas injection), the safety gate 48 opens the injection cycle will abort and the system will exit the auto mode (block 340). The ram position proximity switch 81 does not form a similar interlocking system. Thus, once the resin injection is complete, the ram 50 can begin it's recovery and prepare for the next injection cycle, during the pressurized gas injection cycle.

Once the injection of molten or plastic resin is complete (block 400), the pressurized gas injection cycle is initiated. First the "step register" is initialized (i.e., the step number N is set equal to 1) (block 410). Then the "timer" is set equal to the "step time" for step N (block 420) and the "auto pressure" is set equal to the "step pressure" for step N (block 430) (for the first time through the loop—blocks 420 to 480—N will equal 1). The "step time" and the "step pressure" for each step N are the values entered in the "enter values" subroutine 290. If N equals 1 (i.e., the first step) (block 440), the fast operating valve 44 is opened (block 450) to inject gas into the molten or plastic resin at the first predetermined and precisely controlled pressure (equal to the "step pressure" for step 1). The fast operating valve will automatically close once the pressure reaches the first predetermined pressure. Although not shown in the flow chart, a delay time $T_1$ (see FIG. 2) between the completion of the injection of the plastic (block 400) and the initial injection of pressurized gas (block 450) can be inserted if desired. After the fast operating valve is opened (block 450), the pressure is held at the "step pressure" level for the "step time" duration (block 460). After holding at the desired pressure for the desired time (block 460), the system determines if the pressurized gas injection cycle is complete (block 470). If the cycle is not complete, the "step register" is incremented by 1 (i.e., N=N+1) (block 480) and the system returns to block 420 to begin the gas injection cycle once again for the next step N. The gas injection cycle repeats itself exactly as described for the first cycle (N=1) except that block 460 (opening the fast operating valve) is bypassed. In other words, the "timer" and "auto pressure" values are set for the appropriate step N (blocks 420 and 430) and, since N is not equal to 1 in block 440, the system proceeds directly to block 460 where the "step pressure" is maintained for the "step time."

The gas injection cycle or loop (blocks 420 through 480) is repeated for the desired number of steps whereby the pressure in the mold cavity is reduced to the second predetermined and precisely controlled pressure (240 in FIG. 2). This second predetermined and precisely controlled pressure is usually—but is not required to be—the last step in the cycle or loop. In some instances it may be desirable to further reduce the pressure in a stepwise fashion after the second predetermined and precisely controlled pressure. In other words, the pressure can be further reduced in a stepwise fashion to the final venting pressure using this gas injection cycle or loop. As one skill in the art will realized, this gas injection cycle or loop can easily be adjusted by varying the input values in the "enter values" subroutine 290 to obtain almost endless variations or patterns for stepping up or stepping down the pressure in the mold cavity. As noted above, one such pattern is shown in FIG. 2. Once the gas injection cycle or loop is compete (i.e., the last step N has been carried out), the system will exit the auto mode via blocks 470 and 340.

If the manual mode of operation (block 310) is selected, an operator can manually inject gas at a single pressure level (i.e., the "manual pressure" of block 350). No resin is injected into the mold cavity 28 during the manual mode of operation. As noted above, the manual mode can be used for determining various operational parameters and for diagnostics and system evaluations. Perhaps more importantly, the manual mode can be used to clear plugged lines in or associated with the mold 30 and mold cavity 28. The operator first sets the manual pressure desired (block 351) by entering that pressure via the touch sensitive screen input device 87. (Although not shown in the flow chart, the computer software could easily be modified so that the manual pressure could be entered via the "enter value" subroutine 290.) Once the manual pressure has been set, the operator, again using the touch sensitive screen input device 87, manually activates or opens the fast operating valve, thereby blowing pressurized gas at the manual pressure into the mold cavity 28 (block 360). Gas is injected until the operator deactivates or closes the fast operating valve (block 370). After the fast opening valve is closed, the system exits from the manual mode. This manual injection cycle can be repeated as often as desired or needed to, for example, clear the lines.

After exiting either the auto mode (block 340) or the manual mode (block 370), the system returns to the main truck line (FIG. 5). From this point, the system can return to the auto mode (block 300) or the manual mode (block 310) or the system can be turned off (block 320). The system can be started up or re-enabled through the "enable system" subroutine 280. As one skilled in the art will realize, the flow chart in FIG. 5 could easily be modified, if desired, so that, for example, the "enter values" subroutine 290 could be entered from the auto mode (block 300) without having to turn the system off and then back on. Many other variations could be made in the flow charts and the system using conventional flowcharting and programming skills and techniques to obtain a computer software package to operate and control the gas control system of this invention.

That which is claimed is:

1. An apparatus for introducing an injection gas into the interior of a mold cavity, said apparatus including, in combination:
   (a) a source of injection gas;
   (b) a gas booster having an inlet in fluid communication with the source of injection gas;
   (c) a pressure regulator in fluid communication with an outlet of the gas booster;
   (d) a fast operating valve in fluid communication with the pressure regulator;
   (e) a mold cavity in fluid communication with the fast operating valve;
   (f) a first pressure transducer located between and in fluid communication with the pressure regulator and the fast operating valve; and
   (g) a second pressure transducer located between and in fluid communication with the fast operating valve and the mold cavity.

2. The apparatus defined in claim 1, wherein the gas booster has an inlet and an outlet, where the inlet of the gas booster is in fluid communication with the source of injection gas and the outlet of the gas booster is in fluid communication with the pressure regulator and wherein a pressure relief valve and a fixed volume gas reservoir are located between and in fluid communication with the outlet of the gas booster and the pressure regulator.

3. The apparatus defined in claim 2, and further including a control means to control the pressure regulator, the back pressure regulator, and the fast operating valve.

4. The apparatus defined in claim 3, wherein the control means includes a computer utilizing a programmable logic controller.

5. The apparatus defined in claim 4, and including a first pilot switch connected to the gas booster to shut off the gas booster if the source of injection gas falls below a predetermined pressure.

6. The apparatus defined in claim 5, and including a second pilot switch to vent excess pressure from the gas booster if the pressure of the source of injection gas is increased by the gas booster above a predetermined pressure.

7. The apparatus defined in claim 6, wherein the volume of the fixed volume gas reservoir is approximately 15 to 25 cubic inches.

8. The apparatus defined in claim 7, wherein the control means is electrically connected to the pressure regulator and the first pressure transducer to establish a first control loop to control the injection pressure of gas as it is injected into the mold cavity.

9. The apparatus defined in claim 8, wherein the control means is electrically connected to the second pressure transducer and the back pressure regulator to establish a second control loop to control the pressure of the injection gas inside the mold cavity after the injection gas has been injected into the mold cavity.

10. A gas pressure control apparatus for controlling the pressure of an injection gas during injection into a mold cavity, said apparatus including in combination
    (a) a source of injection gas connected to,
    (b) a gas booster connected to,
    (c) a fixed volume gas reservoir connected to,
    (d) a pressure regulator connected to,
    (e) a first pressure transducer connected to,
    (f) a fast operating valve connected to the mold cavity; and
    (g) a second pressure transducer connected to the fast operating valve and the mold cavity.

11. The apparatus defined in claim 10, and further including apparatus for controlling the pressure of the injection gas after injection into the mold cavity, said apparatus further including combination:
    (h) a back pressure regulator connected to the fast operating valve, the second pressure transducer, and the mold cavity.

12. The apparatus defined in claim 11, and further including:
    (i) a computer electrically connected to the pressure regulator, the fast operating valve, and the first pressure transducer to establish a first control loop for controlling the pressure of the injection gas during injection of the injection gas into the mold cavity.

13. The apparatus defined in claim 12, and further including (j) a computer being electrically connected to the back pressure regulator, the fast operating valve, and the second pressure transducer to establish a second control loop for controlling the pressure of the injection gas within the mold cavity after injection of the injection gas into the mold cavity.

14. The apparatus defined in claim 13, wherein the computer further includes:
   (k) an operator interface terminal;
   (l) a power supply;
   (m) a first relay;
   (n) a second relay;
   (o) a central processing unit; and
   (p) a programmable logic controller.

15. The apparatus defined in claim 14, and further including:
   (q) a ram position proximity switch connected to the first relay; and
   (r) a gate closed proximity switch connected to the second relay.

16. A gas assisted injection molding system, said system including, in combination:
   (a) a first apparatus for plasticizing a quantity of injection molding material, the first apparatus including an injection ram for plasticizing the molding material, and an injection machine nozzle communicating with the injection ram for delivering a quantity of molding material;
   (b) a mold cavity in communication with the injection machine nozzle to receive the molding material;
   (c) a second apparatus for injecting a pressurized gas into the mold cavity only after the flow of molten plastic has been stopped;
   (d) a source of pressurized gas connected to the second apparatus;
   (e) a gas booster in fluid communication with the source of pressurized gas;
   (f) a pressure regulator in fluid communication with the outlet of the gas booster;
   (g) a fast operating valve in fluid communication with the pressure regulator and the mold cavity; and
   (h) a first pressure transducer located between and in fluid communication with the fast operating valve and the mold cavity.

17. The system defined in claim 16, and further including (i) a gas reservoir in fluid communication with the gas booster and the pressure regulator.

18. The system defined in claim 17, and further including: (j) a second pressure transducer located between and in fluid communication with the pressure regulator and the fast operating valve.

19. The system defined in claim 18, and further including:
   (k) a second pressure transducer located between and in fluid communication with the fast operating valve and the mold cavity; and
   (l) a back pressure regulator located between and in fluid communication with the fast operating valve and the mold cavity.

20. The system defined in claim 19, and further including:
   (m) a control means connected to the pressure regulator, the first pressure transducer, the fast operating valve, the second pressure transducer, and the back pressure regulator to control the pressure of the pressurized gas during and after injection into the mold cavity.

21. The system defined in claim 20, wherein the control means includes:
   (n) a ram position proximity switch connected to the control means; and
   (o) a gate closed proximity switch connected to the control means.

22. The system defined in claim 21, wherein the control means further includes:
   (p) a central processing unit;
   (q) a power supply connected to the central processing unit;
   (r) an operator interface terminal connected to the central processing unit; and
   (s) a programmable logic controller connected to the central processing unit.

23. The system defined in claim 22, further including (t) a printer connected to the programmable logic controller.

* * * * *